United States Patent [19]

Broadbent et al.

[11] Patent Number: 5,127,775
[45] Date of Patent: Jul. 7, 1992

[54] FAIL SAFE STOP FOR A DRILL PRESS CONTROL DEVICE

[75] Inventors: James M. Broadbent, Wilbraham; John Kapusta, Florence; Keith P. Paquette, Granby, all of Mass.

[73] Assignee: Smith & Wesson Corp., Springfield, Mass.

[21] Appl. No.: 786,599

[22] Filed: Nov. 1, 1991

[51] Int. Cl.⁵ .................................... B23B 49/00
[52] U.S. Cl. ................................ 408/4; 408/14; 408/241 S; 409/218
[58] Field of Search ............ 408/241 S, 4, 14, 241 R; 409/218; 82/153, 154; 83/529; 33/628, 638

[56] References Cited

U.S. PATENT DOCUMENTS

| | | | |
|---|---|---|---|
| 2,909,082 | 10/1959 | Booth | 408/14 X |
| 3,689,172 | 9/1972 | Stites | 408/241 S |
| 3,724,963 | 4/1973 | Stadtmiller | 408/14 |
| 3,724,964 | 4/1973 | Needham, Jr. | 408/14 |

*Primary Examiner*—Steven C. Bishop
*Attorney, Agent, or Firm*—Chapin, Neal & Dempsey

[57] ABSTRACT

Quality control attachment adapted to be fitted onto a threaded depth control bar of a drill press machine includes a sleeve having an axial opening for fitting onto the control bar and being longitudinally movable relative to the bar. The sleeve carries a pawl and an elastic O-ring which urges an edge portion of the pawl into engagement with the threads of the control bar for enabling one-way movement of the control bar downwardly through the sleeve. An actuator pin is slidably disposed in a bore which extends through the sleeve and is movable downwardly in response to contact with a stop-nut disposed on the bar when the drill press has advanced to a preset depth represented by the position of the stop-nut. The attachment serves to prevent retraction of the drill from a hole unless the control bar, which tracks axial movement of the drill, has moved downward sufficiently for the actuator pin to contact the stop-nut and shift the pawl outwardly of the control bar thereby ensuring that the hole has been drilled to its preset depth.

8 Claims, 3 Drawing Sheets

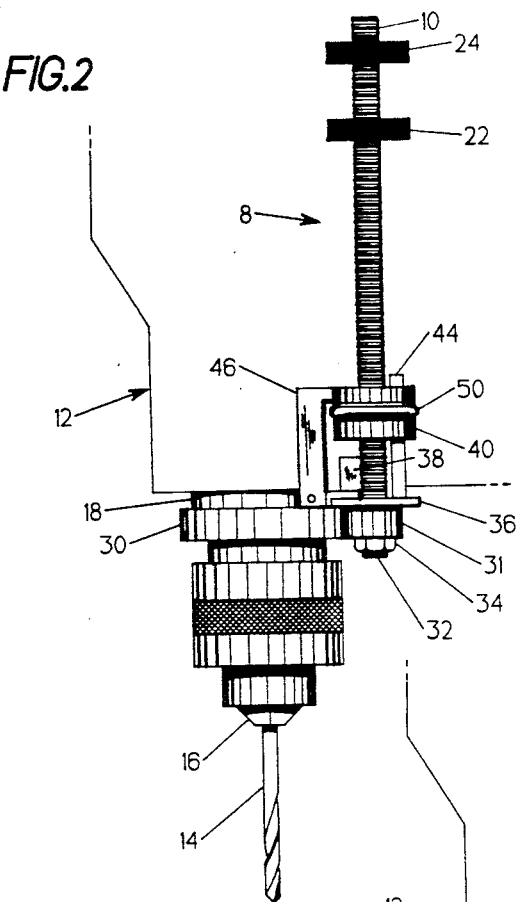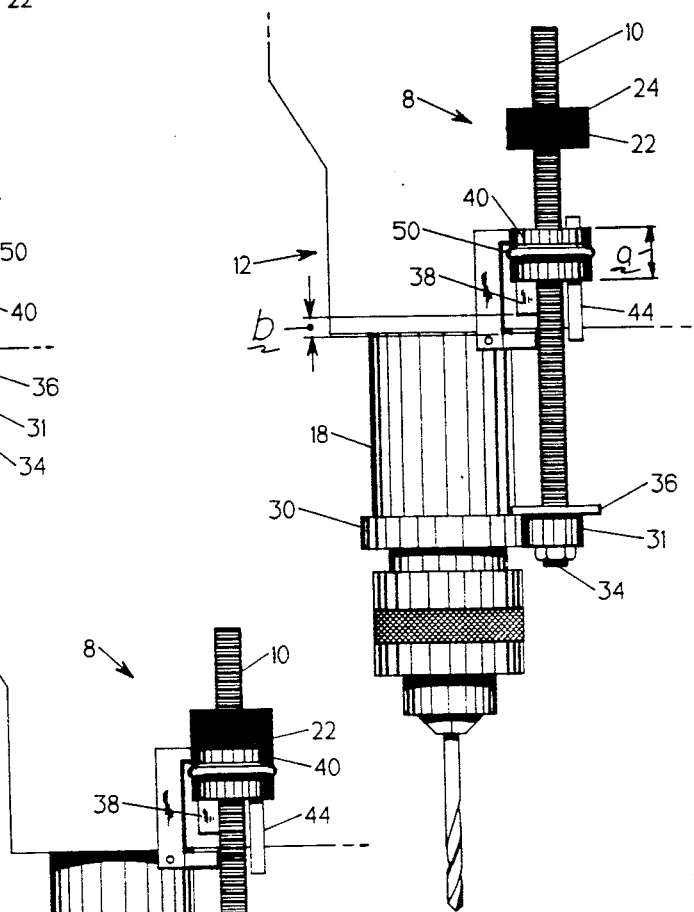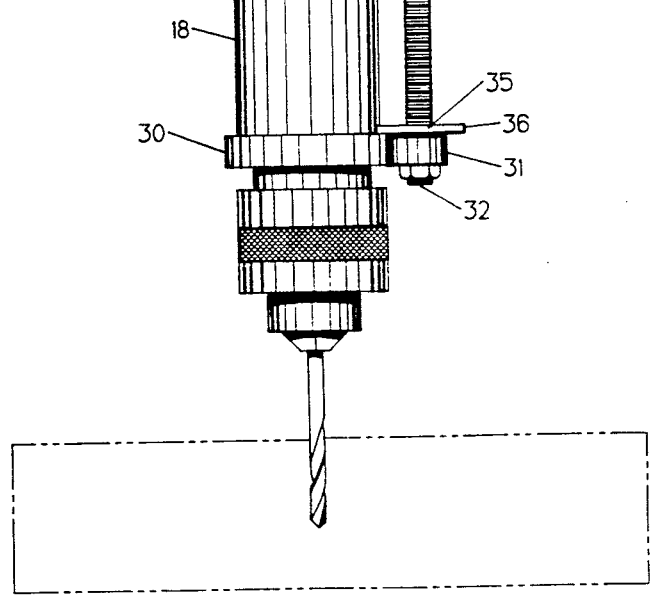

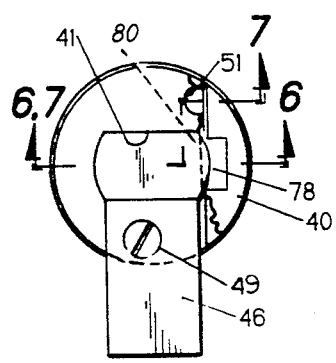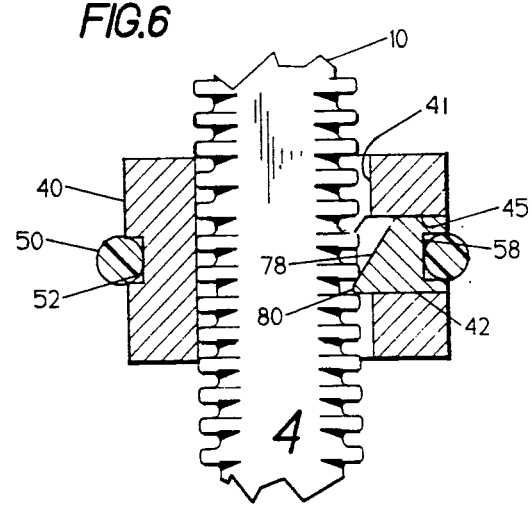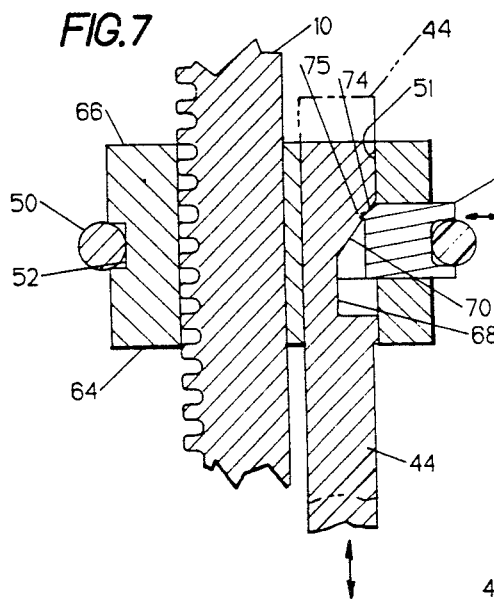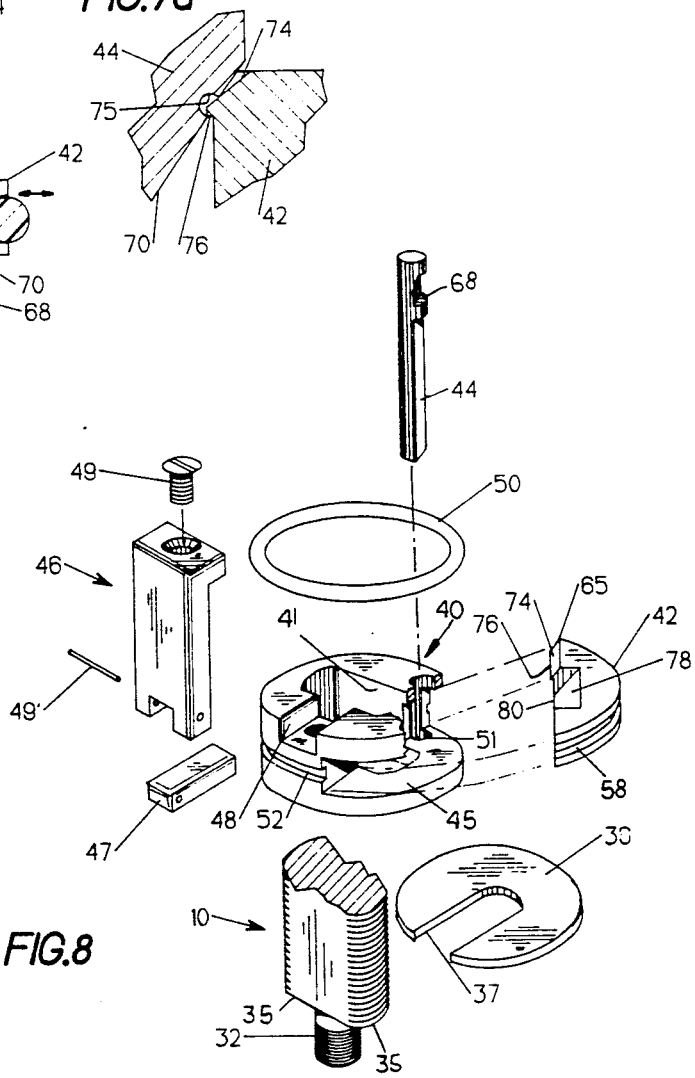

FAIL SAFE STOP FOR A DRILL PRESS CONTROL DEVICE

BACKGROUND OF THE INVENTION

While there are presently available various types of automatic tools, including drill presses which are electronically and/or computer controlled to ensure precise and uniformly consistant results, such machines are costly and tend to obsolete the large numbers of drill press machines which are not equipped with such automatic control systems.

There has, thus, been a long-felt need to provide an inexpensive, simple and reliable device for retrofitting onto existing machines to significantly upgrade the performance of such machines.

In U.S. Pat. No. 2,909,082 to Booth, dated Oct. 20, 1959, a device, which can be attached to a standard drill press, is disclosed for automatically feeding or advancing the drill spindle into the work and for stopping the press upon the completion of a hole drilled to a predetermined depth. While this patent discloses a device for the automatic feed and depth control of a drill press, it requires the use of coil spring 62, that is fitted around the control bar to overpower the spring 42 that conventionally urges the spindle upwardly. A limit switch in an electrical circuit is also required to de-energize the spindle drive motor. Nothing is disclosed in the Booth patent, however, which would physically prevent turning "off" switch 31 using the handle 18 to retract the drill before a hole has been bored to its full depth. Moreover, since the force of return spring 42 is overcome by coil spring 62, the handle 18 must be used to retract the spindle and for each operating cycle, the operator would have to lock the spindle in its "up" position to set up for another cycle of operation. In addition, the length of spring 62 would substantially reduce the maximum depth of holes which could be drilled using this device.

It is the principal object of this invention to provide a mechanical quality control device of simple and inexpensive construction for attachment to existing drill presses which can be easily installed, is simple to use and which is yet highly effective to ensure that drill press operators to not retract the drill from a workpiece until each hole has been drilled to its full depth.

It is another object of this invention to provide an after-market attachment of the above type in which the component thereof most subject to wear can be readily replaced by a commonplace elastic O-ring.

It is a further object of this invention to provide an attachment of the above type which can be readily fitted onto existing drill presses without any modification thereof and which does not otherwise change the operating procedures nor performance characteristics of the press.

The above and other objects and advantages of this invention will be more readily apparent from the following description read in conjunction with the accompanying drawings in which:

FIGS. 2-4 are elevational views of the attachment in three different operative positions of this drill press;

FIG. 5 is a top plan view of the attachment;

FIG. 6 is a section taken along line 6—6 of FIG. 5, on an enlarged scale, in which parts of the attachment are depicted in one operative position.

FIG. 7 is a section, on an enlarged scale, taken along line 7—7 of FIG. 5, in which the parts are shown in an operative position different from FIG 6;

FIG. 7a is from a partial view, on an enlarged scale, showing a portion of FIG. 7, and FIG. 8 is an exploded, perspective view of the attachment.

Figure 1:
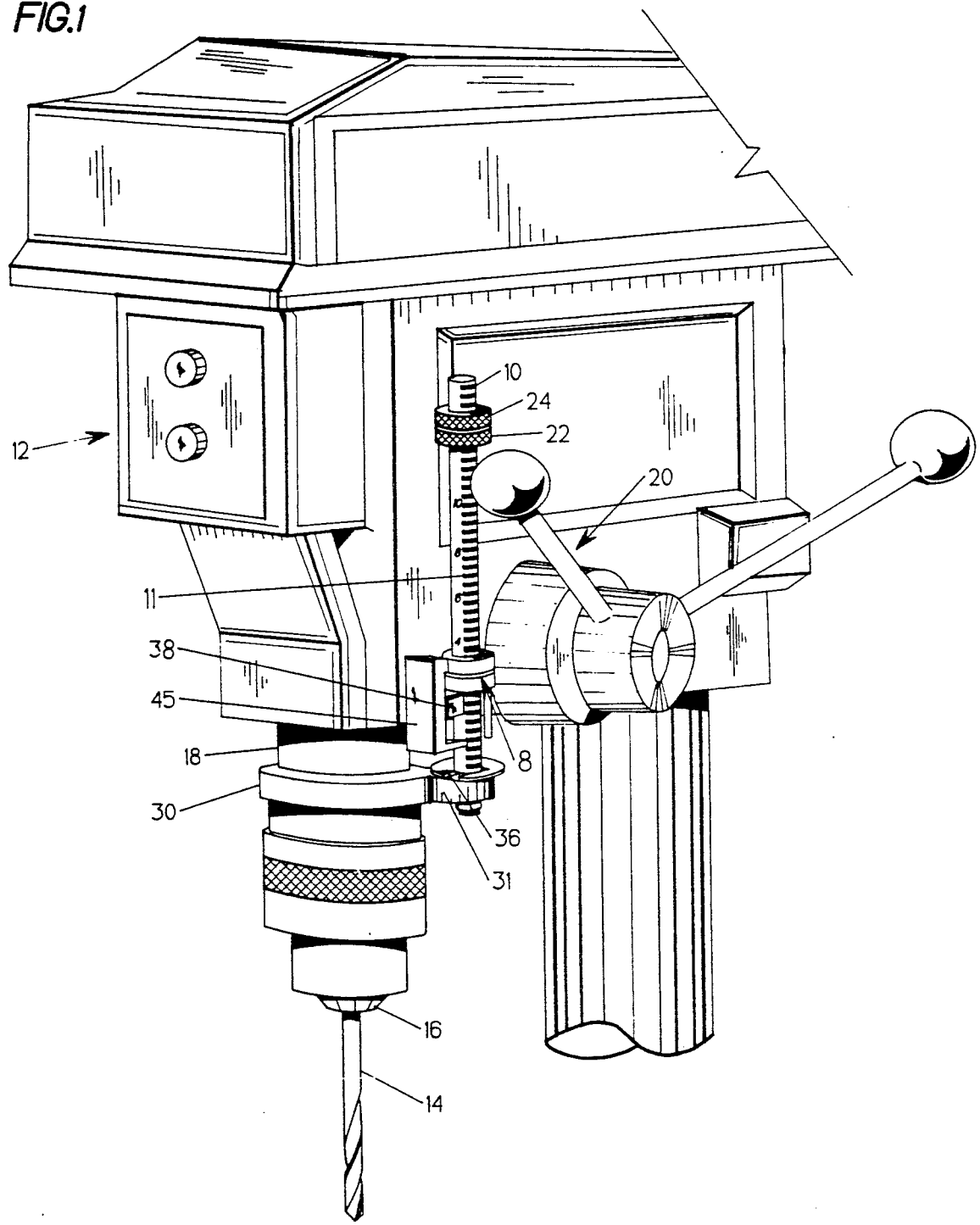
FIG. 1 is a perspective view of a conventional drill press onto which is fitted an attachment of the type embodying this invention.

FIG. 1 is shown a quality control attachment embodying this invention, generally at 8, which is fitted onto a depth control bar 10 of a conventional drill press machine 12 of the type extensively being used at the present time in the manufacturing industry. The drill press 12 includes means to drive a drill bit 14, removably fitted into a chuck 16, carried by a spindle 18 which is reciprocable vertically for boring holes in workpieces, usually of metallic composition. The spindle is rotatably driven by a motor and is also axially movable by rotation of the feed handle 20 whereby the rotating drill will be caused to advance axially downward to drill a hole in a workpiece to any predetermined depth depending upon the location of the knurled stop-nut 22 on the bar 10, threaded as at 11. Generally, the control bar 10 has a length of approximately 6-inches or 15-centimeters. A second nut 24 is also threaded onto the bar 10 which serves to lock the nut 22 in any preset longitudinal position on the bar when the nut 24 is disposed in abutting relation against the nut 22, as shown in FIG. 1 of the drawing.

The drill press includes a fitting 30 which extends laterally from and moves vertically with the spindle 18 and at its outer end includes a quill 31 with a hole therethrough adapted to receive the threaded shank 32 (FIG. 2) of reduced diameter on the lower end of the bar 10. A nut 34 securely fastens the bar 10 in upright orientation on the quill. A flat washer 36 which has a radial slot 37 (FIG. 8) adapted to fit about the bar 10 is disposed on the upper surface of the quill 31 and held in place by the shoulders 35 of bar 10 which extend outwardly of the shank 32 thereof.

The drill press also has a stationary arm 38 which extends laterally from the housing of the drill press 12 and conventionally serves as an adjustable stop disposed to be engaged by the underside of the stop-nut 22 to limit the depth of a hole to be drilled by the machine. When an existing drill press, such as at 12, is retrofitted with the attachment 8, the arm 38 serves to hold the attachment 8 stationary, except for "pecking" motion, relative to the bar during the reciprocable strokes of the drill 14. To install the attachment to an existing drill press, it is only necessary to unscrew the nut 34 from the threaded stud 32, remove the stop-bar from the quill 31, install the attachment 8 on the bar and reassemble the bar, as shown in FIG. 1.

The attachment comprises a generally cylindrical, metallic sleeve 40, a pawl 42, an actuator rod or pin 44 and an elastic O-ring 50. The sleeve 40 has an axial opening 41 therethrough (FIGS. 5, 6 and 8) configured to provide for the free longitudinal sliding movement of the sleeve relative to the threaded bar 10. The pawl 42 (FIG. 8), fitted into a segmental slot 45 in the sleeve 40, is adapted to engage the threads 11 of the bar 10 to provide for a one-way, ratcheting movement of the bar downwardly through the sleeve 40 which is held in a stationary position by the arm 38. The pin 44, generally cylindrical in cross-section, is slidably fitted into bore 51 which extends through the sleeve and serves as an actuator for shifting the pawl 42 between its engaged and disengaged positions with respect to the threads of the bar 10, as will hereinafter be more fully described. A leg 46 extends outwardly and downwardly in radially offset relation from the sleeve 40 and, at its lower end, terminates in an inwardly extending foot portion 47 which has its inner end disposed adjacent the planar side of bar 10. The arm 38 is disposed between the opposed surfaces of the sleeve 40 and the foot 47. The elastic ring, which may be a conventional O-ring 50, is disposed in an annular recess 52 which extends about the perimeter of the sleeve 40. The O-ring serves to urge the pawl 42 inwardly toward its position of engagement with the bar 10 and to maintain the pawl and pin in their assembled relationship within the sleeve 40.

The bar 10 has arcuately curved and threaded outer end portions and flat side walls which are usually imprinted with suitable metric and English scales to assist in positioning stop-nut 22 for setting the depth of holes to be drilled. The sleeve 40 has a central opening 41 which corresponds to the cross-sectional shape of bar 10 and generally has planar upper and lower surfaces 66 and 64. Preferably, the sleeve has an axial length or height a (FIG. 3) of one-inch or some simple fraction thereof, such as ⅜" to enable the operator to easily adjust the position of stop-nut 22 to account for the sleeve height a in setting up the machine on which the attachment 8 is installed. The segmental-shaped slot 45 communicates at its inner end with the central opening 41 and is adapted to receive the pawl 42 which replicates the configuration of the slot and is movable radially therein. The upper surface of the sleeve 40 includes a radial cutout or recess 48 adapted to receive therein the upper limb portion of the leg 46, as best depicted in FIGS. 5 and 8. A screw 49 is provided for securing the leg 46 in place on the sleeve and the foot 47 is attached to the leg 46 by means of a shear pin 49' which serves as a safety feature. In a situation where, for example, there is a threat of personal injury to the operator which might require immediate withdrawal of the drill bit, the pin 49' would enable the operator to abort the control device. This may be done by simply rotating the handle 20 for immediately retracting the drill bit before the hold being drilled has been completed. In that event, the foot portion 47 of leg 46 would be forced downward by the arm 38, shearing the pin 49' and thereby permitting the drill to be retracted from the work.

The slot 45, at one end thereof, communicates with the central portion of the bore 51 whereby the pawl 42 and the pin 44 are interengageable at the location, as best shown in FIGS. 5 and 7. The recess 52 in the outer surface of the sleeve and recess 58 in the outer surface of the pawl, when fitted together, provide a continous annular recess into which the O-ring 50 may be fitted and by which the pawl is urged radially inward toward the bar 10.

The pawl 42 (FIG. 8) of generally semi-cylindrical configuration, includes coplanar upper and lower surfaces. The inner central portion of the pawl includes an inclined or tapered surface 78 that terminates at its lower end in an edge or toe portion 80 adapted to interengage or fit between adjacent threads 11 of the bar 10, as best depicted in FIG. 6. At one end 65 thereof, the pawl 42 includes a narrow, tapered surface 74 which is disposed adjacent the central opening of bore 51 for engaging with a cam surface 70 formed on the pin 44, as hereinafter will be more fully described. As best depicted in FIG. 7a, the lower edge of the surface 74 projects outwardly to form a lip or detent 76 interengageable with a notch 75 in the pin 44.

The pin 44 is generally cylindrical and includes adjacent its upper end, a cutout or slot 68 adapted to receive therein, one end 65 of the pawl 42, as illustrated in FIG. 8. A cam surface 70 on pin 44 tapers upwardly and outwardly from the upper end of the slot 68 for radially moving the pawl 42. The cam surface 70, adjacent the upper end thereof, includes a notch or slit 75 adapted to interfit with lip 76 of the pawl. The actuator pin 44 extends coaxially through bore 51 in the sleeve 40, is vertically reciprocable therein, as shown by the arrow in FIG. 7, and its upper end is adapted to engage the undersurface of the stop-nut 22 while its lower end is adapted to engage the upper surface of the washer 36. When the upper surface 66 of the sleeve 40 contacts the stop-nut 22, the pin 44 will be moved downward. Conversely, the pin will be moved upward when the lower end thereof contacts washer 36 in response to retraction of the drill from the hole which has been drilled by the press.

The upwardly and outwardly inclined cam surface 70 of pin 44 serves to cam the end 65 of the pawl 42 outwardly, as illustrated in FIG. 7, to disengage the edge 80 of the pawl from the threads 11 of the control bar 10, as depicted in FIG. 6. The tapered upper corner of the pawl, as at 74, will engage the cam surface 70 when the pawl is being cammed outwardly by the downward movement of the pin 44. When the lip 76 of the pawl and the notch 75 are interengaged, the pin 44 will be held in its lower position, as depicted in FIG. 7, and the pawl 42 will thus be returned out of engagement with the threads 11 of the control bar 10 until the pin 44 is moved upwardly, as shown in phantom in FIG. 7.

When the pin 44 is in its upper position, as shown in FIGS. 2 and 3, the edge or toe 80 of the pawl 42, will be engaged with the threads 11 of the bar 10 (FIG. 6). As a result, the bar 10 can be moved relative to the sleeve 40 in one direction only, that is "downwardly" in ratcheting fashion over the pawl 42 which is releasably urged inwardly by the O-ring 50. Because the underside of the pawl 42 is perpendicular to the threads 11, the bar 10 cannot be reversed, or moved upwardly, against the pawl 42 unless and until the actuator pin 44 has been moved downward, which, as mentioned above, occurs when the lower surface of the stop-nut 22 and the upper surface of the actuator pin 44 come into contact. When this happens, the pin 44 is moved to the position shown in FIG. 7 and the pawl 42 is pivoted outwardly so that its inner edge 80 will clear the threaded surfaces of the control bar. The bar 10 is then free to move in both directions relative to the sleeve 40. Thus, after a hole has been drilled to a predetermined depth and the pin 44 has been moved downward and the pawl 42 has been pivoted outwardly, the handle 20 of the drill press 12 may be rotated to withdraw the drill from the bore of the workpiece. This would not be possible, however, unless the actuator pin 44 has been moved downward by the stop-nut 22. Thus, because of this attachment, the operator must complete the drilling of each and every hole to the full depth set on the stop-bar before being able to retract the drill.

This invention does, however, still permit the "pecking" motion of the drill because the bar 10 and the sleeve 40 can be moved together relative to the arm 38 which extends outwardly from the housing of the drill press. Because of the distance b (FIG. 3) between the foot portion 47 thereof and the undersurface of the arm 38 is approximately ½ inch when boring a hole, the drill may be withdrawn intermittently to break and or clear the chips and promote tool life. This important "pecking" feature, which will be recognized by those skilled in the art, can be accomplished, moreover, without affecting in any way the operation of the control attachment embodying this invention.

Thus, having described my invention, what is claimed is:

1. Quality control attachment for a drill press for use in combination with a threaded depth control bar supported on a quill which extends outwardly from a spindle of the drill press and is carried thereby, a stop-nut threaded onto the bar which is adjustable for setting to a predetermined depth of the hole to be drilled by said drill press, said drill press having an arm extended from a housing thereof engageable with said stop-nut to limit the hole to said predetermined depth, said attachment comprising: a pawl disposed in ratcheting engagement with the threads of the control bar to enable one-way movement of said bar downwardly relative to the pawl and for disengagement from said threads to permit upward movement of the bar relative to the sleeve, elastic means for releasably urging said pawl into engagement with said control bar, and an actuator movable from a first to a second position to move the pawl radially out of engagement with the threaded portion of the bar, said actuator, in its first position, being disposed to be engaged by the stop-nut and to be shifted thereby to its second position so that the pawl will prevent upward movement of the bar unless the drill press has advanced to the predetermined depth set by the position of the stop-nut on the control bar.

2. Quality control attachment for a drill press, as set forth in claim 1, in which said pawl is carried in a sleeve fitted onto said control bar, and said means to urge the pawl inwardly comprises an elastomeric O-ring disposed about the sleeve for urging the pawl inwardly toward the threaded control bar.

3. Quality control attachment for a drill press, as set forth in claim 2, in which said pawl and said actuator each include interengageable portions of a detent, for releasably retaining said actuator in its second position and the pawl disengaged from the threads of the control bar.

4. Quality control attachment for a drill press, as set forth in claim 3, in which said sleeve includes a laterally offset leg having a foot portion spaced from the undersurface of the sleeve a distance substantially greater than the height of the arm which extends from the housing, whereby the sleeve carried by said control bar is adapted to move independently of the pawl to provide for "pecking" movement of the drill approximately equal to the said distance.

5. Quality control attachment for a drill press, as set forth in claim 4, in which said sleeve and the outer surface of said pawl are each grooved to define an annular groove in which is fitted said O-ring that urges the pawl inwardly into engagement with the threads of the bar, and in which said pawl includes an inner surface portion tapered from an upper surface to a lower surface thereof at which it terminates in an edge adapted to interfit between adjacent threads of the control bar for ratcheting one-way movement thereover.

6. Quality control attachment for a drill press, as set forth in claim 4, wherein said foot portion is affixed to the offset leg by means of a shear pin so that in an emergency the foot portion may be broken away to enable retraction of the drill before a hole of predetermined depth has been drilled.

7. Quality control attachment for a drill press for use in combination with a threaded depth control bar supported on a quill which extends outwardly from a spindle of the drill press and is carried thereby, a stop-nut threaded onto the bar which is adjustable for setting to a predetermined depth of the hole to be drilled by said drill press, said drill press having an arm extended from a housing thereof engageable with said stop-nut to limit the depth of said hole, said attachment comprising: a sleeve slidably disposed on said bar, a pawl carried by said sleeve disposed in one position in engagement with the threads of the control bar to enable one-way, downward ratcheting movement of said bar relative to the pawl and in a second position disengaged from said threads to permit upward movement of the bar relative to the sleeve, an actuator pin carried by said sleeve and vertically movable between an "up" position in which one end thereof extends above the sleeve and a "down" position, said pin including a cam portion disposed to engage the pawl to move the pawl to its second position, out of engagement with the threaded portion of the bar, and an O-ring for retaining said pawl and pin in assembled relation on the sleeve and for releasably urging said pawl into engagement with said control bar.

8. Quality control attachment for a drill press, as set forth in claim 7, in which said actuator pin includes a slot adapted to receive therein a portion of said pawl when said pawl is in said one position and said pin is in its "up" position, said pin also includes a cam surface to cam the pawl to its second position, out of engagement with said control bar when the pin is moved to its "down" position, said pin and pawl including detent means which are interengageable to releasably retain the pin in its "down" position and the pawl in its second position, said O-ring urging said detent means toward interengaged relationship, said pawl releasably retaining said pin in its "up" position in which it is adapted to contact the stop-nut when a hole has been drilled to a predetermined depth whereby the pin will be shifted downward and the pawl will be shifted out of engagement with the threaded bar to permit withdrawal of the drill from the hole.

* * * * *